Figure 1:
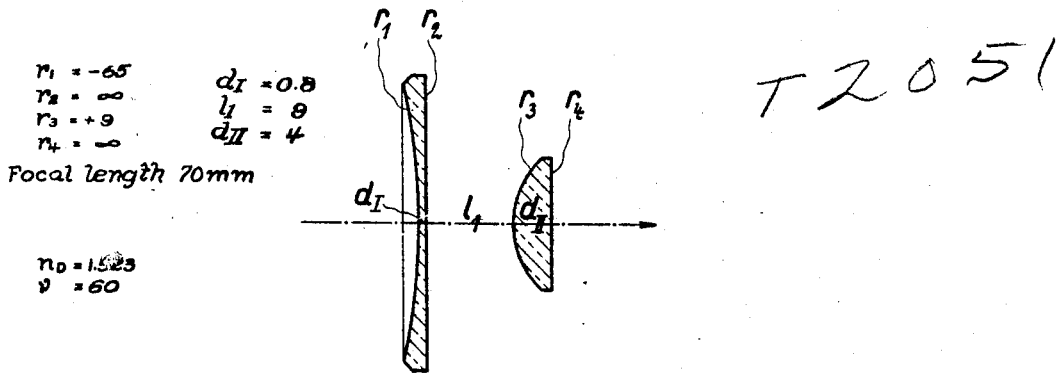
Figure 2:
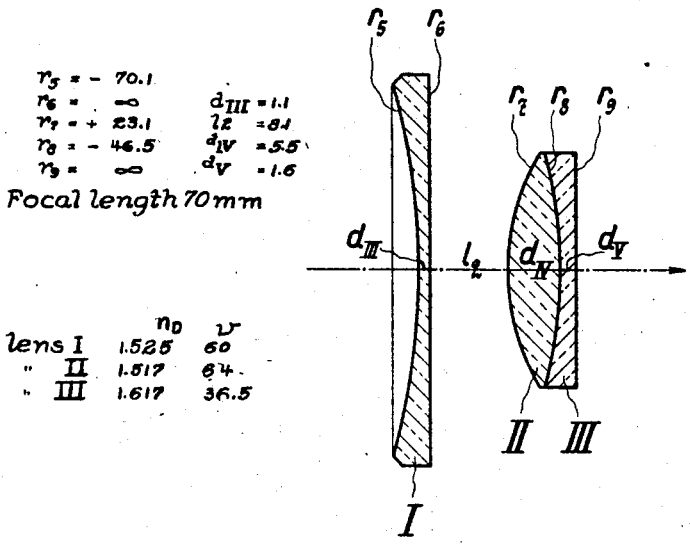

May 1, 1928.　　　　　L. E. W. VAN ALBADA　　　　　1,668,030

OPTICAL SYSTEM OF MAGNIFYING GLASSES

Filed July 14, 1924

Inventor:
L. E. W. Van Albada

Patented May 1, 1928.

1,668,030

UNITED STATES PATENT OFFICE.

LIEUWE EVERT WILLEM VAN ALBADA, OF AMSTERDAM, NETHERLANDS, ASSIGNOR TO THE FIRM CARL ZEISS, OF JENA, GERMANY.

OPTICAL SYSTEM OF MAGNIFYING GLASSES.

Application filed July 14, 1924, Serial No. 726,028, and in Germany January 6, 1923.

The subject of the present invention forms a magnifying glass which, whilst being of simplified construction, only shows very slight image defects, particularly only an exceedingly slight distortion for a comparatively large field of vision. According to the present invention the optical system consists of a dispersive front member and a collective rear member which are somewhat apart, whereby the intermediate air-space is collective. If $R_1$ be the radius of curvature of the back surface of the front member,
$R_2$ the radius of curvature of the front surface of the rear member,
L the distance apart of the said two members.
$n_1$ the refractive index of the glass of the lens having the radius of curvature $R_1$,
$n_2$ the refractive index of the glass of the lens having the radius of curvature $R_2$, the said intermediate air-space has the refractive power $$D = \frac{1-n_1}{R_1} + \frac{n_2-1}{R_2} - L\frac{(1-n_1)(n_2-1)}{R_1 \cdot R_2}$$

The condition that the said collective air-space is collective, reads therefore $$\frac{1-n_1}{R_1} + \frac{n_2-1}{R_2} - L\frac{(1-n_1)(n_2-1)}{R_1 R_2} > 0.$$

Already in the event of each of the two members consisting of a single lens, the colour defects may be kept very slight, however, if particularly slight colour defects are to be attained, at least one of the two members is suitably composed of two lenses.

It has proved of special advantage to make the back surface of the rear member plane but it is still more advantageous to make the back surface of the front member plane too. If the back surface of the front member be plane, the radius of curvature is infinitely great ($R_1 = \infty$). In that case the above condition that the intermediate air-space is collective, passes over into the condition.

$$\frac{n_2-1}{R_2} > 0.$$

As always $$n_2 - 1 > 0,$$

this condition is fulfilled if $$R_2 > 0,$$

i. e. if the front surface of the rear member be convex.

The annexed drawing shows two constructional examples of the invention, whereby each of the two figures shows a longitudinal section of one of the examples.

The data of construction of the first example in millimeters for a focal length of 70 mm. of the magnifying lens are as follows:

$r_1 = -65$
$r_2 = \infty$
$r_3 = +9$
$r_4 = \infty$ $d_I = 0{,}8$
$l_1 = 9$
$d_{II} = 4$ Both members consist of the same glass as characterized by the values $n_D = 1{,}523$
$v = 60$ For the second example the following values, likewise for a focal length of 70 mm., hold good:

$r_5 = -70{,}1$
$r_6 = \infty$
$r_7 = +23{,}1$
$r_8 = -46.5$
$r_9 = \infty$ $d_{III} = 1{,}1$
$l^2 = 8{,}1$
$d_{IV} = 5{,}5$
$d_V = 1{,}6$ The following kinds of glass are used:

|        | $n_D$  | $v$  |
|--------|--------|------|
| Lens I | 1,525  | 60   |
| " II   | 1,517  | 64   |
| " III  | 1,617  | 36,5 |

I claim:
1. Optical system of a magnifying glass, consisting of a dispersive front member and a collective rear member which members are somewhat apart, between the radius of curvature $R_1$ of the back surface of the front member, the radius of curvature $R_2$ of the front surface of the rear member, the distance apart L of the said two members, and the refractive indices $n_1$ and $n_2$ of the glass of the lenses having the radius of curvature $R_1$ and $R_2$ respectively being the relation $$\frac{1-n_1}{R_1}+\frac{n_2-1}{R_2}-L\frac{(1-n_1)(n_2-1)}{R_1 R_2}>0.$$

2. Optical system of a magnifying glass, consisting of a dispersive front member, the back surface of which is plane, and a collective rear member, the front surface of which is convex, which members are somewhat apart.

3. Optical system of a magnifying glass, consisting of a dispersive front member, the back surface of which is plane, and a collective rear member, the front surface of which is convex, while its back surface is plane, which members are somewhat apart.

L. E. W. VAN ALBADA.